United States Patent Office 3,627,543
Patented Dec. 14, 1971

3,627,543
PAN DRIED GLUCOSE FREE EGG WHITE ALBUMEN CONTAINING MEANS FOR INHIBITING DISCOLORATION WHEN HEAT TREATED AND THE PROCESS OF PREPARING THE SAME
Jacob J. Epstein, 335 Alden Drive,
Addison, Ill. 60101
No Drawing. Continuation-in-part of abandoned application Ser. No. 617,053, Feb. 20, 1967. This application Feb. 18, 1969, Ser. No. 800,257
Int. Cl. A23b 5/00, 5/02
U.S. Cl. 99—210                    7 Claims

ABSTRACT OF THE DISCLOSURE

A pan dried glucose-free egg white albumen containing between 0.035 percent and 0.75 percent aluminum ion by weight on a dry solid basis to preserve the original color of the albumen and inhibit discoloration thereof upon the dried product being subjected to heat treatment to eliminate or substantially reduce the pathogenic organisms therein, such as salmonella and staphylococci, and/or prolonged storage is provided by a process in which glucose is removed from a liquid egg white at an adjusted pH of less than 5.9 and aluminum salt is added to the glucose-free liquid albumen in a concentration sufficient to produce a pan-dried albumen glucose-free egg white containing between 0.035 and 0.75 percent aluminum ion.

---

This application is a continuation-in-part of application Ser. No. 617,053, filed Feb. 20, 1967, now abandoned.

BACKGROUND OF THE INVENTION

Field of the invention

The present invention relates to a pan dried glucose free egg white albumen containing means for inhibiting the discoloration thereof, and a process of preparing the same, and more particularly to such a product or process in which the liquid egg white is subjected to the removal of glucose by fermentation, enzyme action or other suitable means, and, in which after the removal of glucose, but prior to the pan drying of the glucose free liquid albumen there is added an aluminum salt to the liquid albumen in an amount such that on the drying thereof the dried glucose free albumen product contains between 0.035 percent to 0.75% aluminum ion by weight on a dry solid basis so as to preserve the original color although the albumen is subjected to the prolonged heat treatments used to reduce the pathogenic organisms therein, and prolonged storage.

DESCRIPTION OF THE PRIOR ART

Heretofore, heat treatments of dried egg white have been employed of varying duration for the reduction of the bacteria count in general and the elimination of pathogenic organisms of the genus salmonella.

The length of the heat treatments resulting in the complete killing of salmonella depends upon the time and temperature of exposure. For example, flake albumen may become free of salmonella in approximately forty (40) hours at a temperature of one hundred forty degrees Fahrenheit (140° F.); the time will be approximately forty-eight (48) hours at a temperature of one hundred and thirty degrees Fahrenheit (130° F.); and it will take three or more days to obtain salmonella free albumen at a temperature of one hundred and twenty degrees Fehrenheit (120° F.).

Prolonged heat treatments at temperatures over one hundred and twenty degrees Fahrenheit (120° F.) may result in an undesirable discoloration of some or all of the flake particles. This alteration of color of such dried egg white is exactly the same as that which is observed after a prolonged aging of the dried egg white during storage. Such discoloration in the flake particles is an inherent disadvantage in the saleability of the albumen on the market.

The discoloration of such dried egg white, in which the natural sugar content or glucose has been retained, is attributed to a Maillard type reaction wherein the aldehyde group of the glucose reacts with an amino group from the protein. It is possible that polysaccharides which are present, free or bound, in the egg white may hydrolyze, thereby forming a simpler and more reactive aldose.

In any event, the dried egg white with a natural glucose content would normally discolor, without being subjected to heat treatment, and merely during prolonged storage. This has been attributed to the so-called Maillard reaction arising in the aging thereof, and which takes place in the presence of protein and sugar or the natural glucose. This non-enzymatic browning reaction does not take place unless there is sugar and protein present.

However, with the natural protein and glucose being present and the dried egg white being in a flake form, the albumen darkens and varies in color from orange to red, depending on the aging conditions, or the conditions of the heat treatment and the moisture content of the dried product. When the dried egg white is in a powder form, the albumen becomes an off-white to light tan, again depending on the aging conditions, or the conditions of the heat treatment and the moisture content of the dried product. Thus the same phenomenon with respect to discoloration of the natural dried egg white is observed under either aging or heat treatment conditions.

In the prior art relating to egg white products and processes of preparing the same, there has been noted an expired U.S. Pat. No. 2,166,070 granted July 11, 1939 to Verne D. Littlefield which discloses the use of aluminum compounds in a dried egg white product, but the dried egg white product that is disclosed in the Littlefield patent has the natural glucose retained therein. Indeed the disclosure of the Littlefield patent specifically avoids removing the glucose from the egg white with the explanation that the Littlefield invention "is based upon the observation that if water soluble non-toxic aluminum compounds are added to acidified egg whites and the whole mass immediately dried, the dried product will give foams of pronounced stability without the necessity for aging or fermentation."

Thus, in the Littlefield patent the liquid egg white is dried with the natural sugar or glucose in it. Such product would normally discolor, even without heating, and just during prolonged storage due to the so-called Maillard reaction which, as heretofore explained, takes place in the presence of protein and the natural sugar or glucose. There is no suggestion in the Littlefield patent of any heat treatment being applied to the dried egg white or that the addition of the aluminum compound would in any sense inhibit discoloration of the natural dried egg white under either conditions of prolonged heat treatments or storage of varying duration.

In a more recent U.S. Pat. No. 3,251,697 granted May 17, 1966, to Hans Lineweaver and Franklin E. Cunningham on an application filed Mar. 19, 1964, for a Process for Pasteurizing Egg White, the Littlefield U.S. Pat. No. 2,166,070 is discussed as follows at column 5, lines 63–75, and column 6, lines 1–4:

"It is recognized that there are known procedures which involve addition of aluminum salts to egg white. Littlefield (U.S. Pat. 2,166,070) discloses adding an aluminum salt to egg white and then spray drying the composite material. The patentee uses a substantial proportion of aluminum, namely, a minimum of ¾ gram of aluminum per pound of dried egg white (equivalent to 1650 p.p.m. on solids basis) and preferably at least 1 gram of aluminum per pound of dried egg white (equivalent to 2200 p.p.m. on solids basis). The patentee relies on these large amounts of aluminum to act as a drying agent to increase the water-holding properties of the egg white foam. In contrast, the present invention employs much smaller amounts of aluminum (as little as one-twentieth of Littlefield's minimum concentration) and achieves a result— reduction of heat sensitivity of egg white proteins—which is totally alien to the patentee's teachings."

The purpose of the smaller amounts of aluminum disclosed in the Lineweaver et al. U.S. Pat. No. 3,251,697 is further explained at column 4, lines 64-75, and column 5, lines 1-5 of the patent as follows:

"The ability of the aforesaid polyvalent metal ions to stabilize egg proteins is believed to involve the following principles, not recognized heretofore: our researches on the heating of egg white led to a finding that of the various egg white proteins, conalbumin exhibits the greatest instability. Thus when egg white is held at an elevated temperature, for example at 140° F., the conalbumin is quickly coagulated; the other protein—ovalbumin, lysozyme, ovomucin, ovomucoid, and uncharacterized globulines— are relatively stable and are not coagulated unless the heating is prolonged. Moreover, we found that when any one of the aforesaid polyvalent metals is added before such heating, the conalbumin does not coagulate at temperatures and times desired for pasteurization (i.e., 140° F., for several minutes). In other words, it is believed that the additive has the specific effect of increasing the thermal stability of conalbumin."

In contrast, the purpose of the present invention is to preserve the original color of the albumen of a dried glucose free albumen which has been subjected to long periods of heat treatment of varying duration to eliminate or substantially reduce the pathogenic organisms therein. Further my present invention involved the discovery that the use of aluminum ion at a level of not less than 0.035 percent of aluminum ion based on the "as is" weight of the dried glucose free albumen was necessary to inhibit discoloration upon the dried albumen being subjected to such long periods of heat treatments or prolonged storage.

Furthermore, I have discovered that the reaction of the aluminum ion and its inhibition of discoloration of the egg white is an "all or none" type of reaction i.e., when a particle of the dried glucose free albumen is discolored by prolonged heat treatments or storage, it is discolored in its entirety and uniformly and, if less than the prescribed amount of aluminum ion of 0.035 percent is used, there is no effectiveness at all in blocking the reaction during prolonged periods of heat treatment or storage. The said Lineweaver patent also states (column 4, lines 27-29):

"For best results the pH is adjusted to a level of 6.5 to 7. However, in general, beneficial results are obtained at pH's in the range 6 to 8."

In contrast, the present invention adds the aluminum salts at pH range below 5.9 and the most beneficial results are attained at low pH levels, for example, below 5.35. This indicates that glucose free egg white used in the present invention is a fundamentally different system and involves fundamentally different mechanisms.

SUMMARY

In my invention, the original color of the albumen of the egg white is preserved under conditions of prolonged heat treatments or storage by removing the glucose from the liquid egg white by fermentation, enzyme action or other suitable means so as to provide a product having the desirable characteristics of good albumen and in which the danger that the albumen will turn red or brown during prolonged heat treatments or storage due to the so-called Maillard type reaction taking place is substantially lessened. Thus, unless the protein has a chance to react with the glucose in the egg white, no discoloration can take place due to such Maillard type reaction.

However, even though the albumen has been treated so as to be theoretically free of glucose as determined by the usual laboratory methods of Michael Samogyi J. Biol. Chem. 160:6; (1945) and Norton Nelson J. Biol. Chem. 153:375 (1944) alteration of the color of the dried glucose free albumen flake or powder product has been observed at times of a different type after prolonged heat treatments or storage. Whether this discoloration is caused by indeterminable traces of the sugar or natural glucose or not, or whether the latter type discoloration involves a different type of reaction from the Maillard type reaction, has not been determined.

It is possible that polysaccharides which are present, free or bound, in egg white may hydrolyze, thereby forming a simpler and more reactive aldose which in turn may react with the protein in the so-called dried glucose free albumen to effect the latter type discoloration.

I have found that the pH value of the dried glucose free albumen is an important factor and that, if dried glucose free albumen has a pH value lower than 5.35-5.4, the latter discoloration phenomenon is particularly evident.

The moisture content of the dried glucose free albumen has also been found to be a factor in this reaction. It is a factor, however, only insofar as the reaction rate is concerned and is not a factor as to whether or not the reaction will take place. The lower the moisture level the slower the reaction. The larger the particle, generally speaking, the higher the moisture content of the dried glucose free albumen; and also the more obvious will be the resulting discoloration thereof upon prolonged storage or heat treatment of the dried glucose free albumen.

I have discovered that the latter discoloration is inhibited by the addition of aluminum salts to the liquid egg white either before, during, or after removal of the glucose of the egg white, but prior to the drying of the glucose free albumen. The quantity of the added aluminum salts must be sufficient for the subsequently dried glucose free albumen product to contain at least 0.035 percent aluminum ion by weight on a dry solids basis.

In order to accomplish this any aluminum salt which is compatible in a food product and which is sufficiently soluble to yield the required quantity of aluminum cations would be satisfactory and may include, by way of example, aluminum salts such as the acetate; chloride; phosphate; potassium tartrate; sodium chloride complex; sulfate, both anhydrous and hydrate; ammonium sulfate; sodium sulfate, etc.

The use of the aluminum ion at a level of not less than 0.035 percent in the dried glucose free albumen product, based on the "as is" weight thereof, serves to inhibit the discoloration thereof during prolonged heat treatment and storage. I have further discovered that, as long as the glucose remaining in the so-called dried glucose free albumen product does not exceed 0.2 percent of the weight of the product, the so-called Maillard type reaction can be prevented and discoloration of the product inhibited during prolonged heat treatments and storage thereof by increasing the amount of the aluminum ion added within a critical range of from 0.035 percent to 0.75 percent by weight of the product. However, should the glucose remaining in the dried glucose free albumen exceed the critical limit of 0.2 percent of glucose by weight of the product, then increasing the amount of the aluminum ion added will be ineffective to inhibit the discoloration of the dried product upon prolonged heat treatments or storage.

THE OBJECTS OF THE INVENTION

An object of the invention is to provide a dried glucose free albumen product including not less than 0.035 percent by weight of aluminum ion to inhibit discoloration of the product during prolonged heat treatment or storage thereof.

A further object of the invention is the provision of a dried glucose free albumen product in which the glucose remaining therein is not in excess of 0.2 percent of glucose by weight of the product and including between 0.035 percent and 0.75 percent by weight of aluminum ion so as to prevent discoloration of the product during prolonged heat treatment or storage thereof.

Another object of the invention is to provide a dried albumen product having superior discloration inhibiting properties and including a glucose content of not more than 0.2 percent by weight and an aluminum ion content of between 0.035 percent and 0.75 percent by weight.

A further object of the invention is the provision of a process for preparing a dried glucose free albumen product including at least 0.035 percent of aluminum ion by weight of the product.

Another object of the invention is to provide a process of preparing a dried egg white product having superior discoloration inhibiting properties under prolonged heat treatment conditions and storage, the process including the steps of removing the glucose from a liquid egg white and adding to the liquid egg white before, during or after the step of removing the glucose aluminum salts in a quantity sufficient to produce, upon a subsequent drying, an albumen product containing at least 0.035 percent aluminum ion by weight on a dry solids basis.

A further object of the invention is the provision of a process of preparing a dried egg white having superior discoloration inhibiting properties under prolonged heat treatment and storage conditions, the process including the steps of removing the glucose from a liquid egg white sufficiently to produce, upon a subsequent drying of the resulting albumen, a product containing not more than 0.2 percent glucose by weight, adding to the liquid egg white before, during or after the step of removing the glucose aluminum salts in a quantity sufficient to produce, upon the subsequent drying of the egg white, the product containing between 0.035 percent and 0.75 percent aluminum ion by weight.

Other objects and advantages of this invention are set forth in the following description and the novel features thereof are pointed out in the appended claims. The disclosure, however, is illustrative only and changes may be made therein within the principle of the invention to the full extent indicated by the broad and general meaning of the terms in which the appended claims are expressed.

DESCRIPTION OF THE INVENTION

Specifically, as an example of my invention, a batch of egg white which may be in a natural liquid condition is subjected to a removal of its glucose which may be effected by conventional fermentation, enzyme action or by other suitable means and through which the glucose content of the liquid egg white may be completely removed so that the albumen is free of glucose insofar as may be determined by usual laboratory methods, such as described by Michael Somogyi J. Biol. Chem. 160:61 (1945); and by Norton Nelson J. Biol. Chem. 153:375 (1944).

Further, I have found that the addition of aluminum salts to the liquid egg white after the step of removing its glucose is effective to inhibit discoloration of the egg white upon the egg white being subjected to subsequent prolonged heat treatment or aging upon storage of the dried albumen product. The pH of the egg white after removal of the glucose is adjusted to less than 5.9, and usually to a range from about 5.3 to about 5.8, before addition of the aluminum salt.

My work indicates that a minimum level of 0.035 percent aluminum ion by weight is necessary in the dried glucose free albumen product to inhibit discoloration with a practical maximum of 0.5 percent aluminum ion by weight, where the dried egg white product is free of determinable glucose.

I have further discovered that the narrow range of from 0.035 percent to 0.5 percent may be extended to 0.75 percent aluminum ion by weight to prevent discoloration when as much as 0.2 percent glucose by weight remains in the dried glucose free albumen. Thus, I do know that I can prevent the so-called Maillard type reaction when as much as 0.2 percent glucose remains in the dried egg white by increasing the amount of the aluminum ion added. However, where the glucose content of the dried glucose free albumen is greater than 0.2 percent by weight of glucose, the addition of a still greater amount of aluminum ion is ineffective to inhibit discoloration of the dried egg white under prolonged temperature treatment or aging in storage.

The mixing of the aluminum ion in the egg white is preferably accomplished by adding an aqueous solution of the aluminum salt to be used in the liquid egg white. Thus, for example, to 1,000 lbs. of liquid egg white there may be added 1.205 lbs. of a 25 percent aqueous solution of aluminum sulfate. The liquid egg white may be rendered free of its glucose in the usual manner before, during or after the addition of the aluminum sulfate so that the liquid egg white is free of determinable glucose. The aluminum sulfate glucose free albumen mixture may then be dried in a conventional manner so as to produce a dried albumen product containing at least 0.035 percent of aluminum ion by weight of the dried product so as to afford full protection against discoloration of the albumen under prolonged heat treatment or storage conditions.

While, in the example given, an aqueous solution of aluminum sulfate has been specified, the desired result of a dried glucose free albumen product containing at least 0.035 percent of aluminum ion by weight may be accomplished by the addition to the liquid egg white of any aluminum salt compatible in a food product and which is sufficiently soluble to yield the required quantity of aluminum cations of at least 0.035 percent by weight of the product.

Thus, for aluminum sulfate, there may be substituted in the liquid egg white other salts of aluminum such as acetate; chloride; phosphate; potassium tartrate; sodium chloride complex; sulfate, both anhydrous and hydrate; ammonium sulfate, and sodium sulfate.

The pan dried glucose free albumen product containing at least 0.035 percent aluminum ion by weight may thus be inhibited from discoloration upon thereafter being subjected to prolonged heat treatments or storage.

While several forms of the invention have been described herein, it is to be clearly understood that the invention is not to be limited thereto, but the same is to be considered merely as illustrative of the practice thereof, since the invention is not to be limited except by the appended claims.

What I claim is:

1. A process for preparing a dried egg white product which comprises removing the glucose from liquid egg white and adjusting the pH to a point less than 5.9, adding an aluminum salt to the resultant acidic glucose-free liquid albumen, drying the liquid albumen mixture, said aluminum salt being added in a concentration sufficient to produce upon the drying of the resultant mixture a dried albumen product containing at least 0.035 percent aluminum ion by weight to inhibit discoloration of said product under prolonged heat treatment conditions and storage, and wherein the removal of glucose from the liquid egg white reduces the glucose content thereof sufficiently to produce upon the drying of the resultant albumen mixture a dried product containing not more than about 0.2 percent glucose by weight.

2. The process defined by claim 1 wherein the aluminum salt is a salt of aluminum selected from a group consisting of acetate, chloride, phosphate, potassium tartrate, sodium chloride complex, sulfate, ammonium sulfate and sodium sulfate.

3. The process defined by claim 1 wherein the aluminum salt is added in a concentration sufficient to produce upon the drying of the albumen mixture a dried product containing between 0.035 percent and 0.75 percent aluminum ion by weight.

4. The process defined by claim 3 wherein the aluminum salt is a 25 percent aqueous solution of aluminum sulfate added to the liquid egg white in a concentration of about 1.2 percent by weight of the liquid egg white.

5. A dried glucose-free albumen product containing not in excess of 0.2 percent glucose by weight and containing at least 0.035 percent aluminum ion by weight to inhibit discoloration of the product under prolonged heat treatment and storage conditions.

6. The dried glucose free albumen product defined by claim 5 containing no determinable glucose.

7. The dried glucose free albumen product defined by claim 5 containing not more than 0.2 percent glucose by weight, and between 0.035 percent and 0.75 percent aluminum ion by weight.

References Cited

UNITED STATES PATENTS 2,166,070   7/1939   Littlefield _____ 99—210 X
3,251,697   5/1966   Lineweaver _____ 99—161

NORMAN YUDKOFF, Primary Examiner

J. SOFER, Assistant Examiner

U.S. Cl. X.R.

99—161